April 25, 1961 R. H. MALCOLM 2,980,989
PROCESS FOR CONSTRUCTING AND BALANCING ENGINES
Filed Dec. 20, 1956 3 Sheets-Sheet 1

Inventor:
Robert H. Malcolm
Paul O. Pippel
Atty.

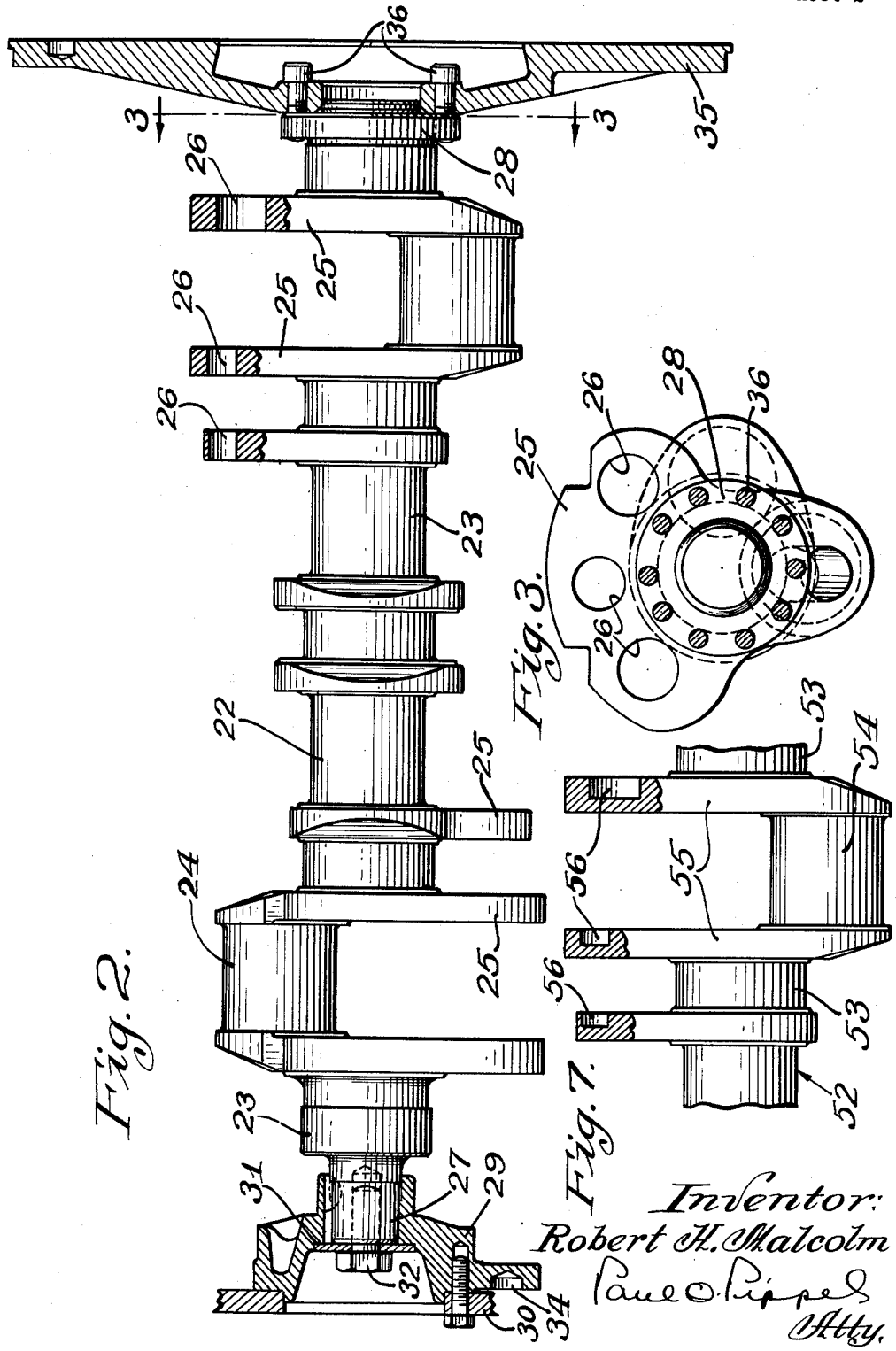

April 25, 1961 R. H. MALCOLM 2,980,989
PROCESS FOR CONSTRUCTING AND BALANCING ENGINES
Filed Dec. 20, 1956 3 Sheets-Sheet 3

Inventor.
Robert H. Malcolm
Paul O. Pippel
Atty.

United States Patent Office 2,980,989
Patented Apr. 25, 1961

2,980,989

PROCESS FOR CONSTRUCTING AND BALANCING ENGINES

Robert H. Malcolm, Fort Wayne, Ind., assignor to International Harvester Company, a corporation of New Jersey Filed Dec. 20, 1956, Ser. No. 629,745

1 Claim. (Cl. 29—156.4)

This invention relates to a process for constructing engines. More specifically the invention relates to a process of constructing internal combustion engines, the said engines each having different piston displacement.

In the manufacture of internal combustion engines wherein the said engines are of different piston sizes and displacement it has been customary in the past to utilize different crankshafts, pulley hubs, and flywheels for each engine. This difference in the said components resulted from the fact that proper balance of the engines could not be obtained unless they were constructed with different parts. Thus it would be the practice of utilizing a larger flywheel, for instance, for a larger piston displacement engine. Or, for instance, a smaller crankshaft might be utilized for a smaller displacement engine. This it was felt was required in order to achieve proper balance of the engines. In one process, known to applicant, identical crankshafts may be utilized for different displacement engines, the balance being achieved by changing the design of the flywheel and the fan pulley hubs. Such changes in the fan pulleys and the flywheels of course cause greater effort and time in manufacture since only one component for both engines is the same, two major components being different in each case. It is a prime object of this invention to provide an assembly and construction process wherein a maximum number of identical parts may be utilized in different displacement engines whereby the said engines are properly balanced.

A further object is to provide an improved process for constructing and assembling engines of different displacement, the said process including the construction and utilization of identical fan pulleys and flywheels which are connected to differently constructed crankshafts and assembled in the different displacement engines to procure the desired balance of each engine.

A more specific object is to provide an improved process for constructing engines of different displacement, the different displacement occurring as a result of different size piston arrangements, the process including the construction of differently designed crankshafts, having fan pulley hubs and flywheels of identical design, the said differently constructed crankshafts compensating for the difference in weight of the different size pistons of each engine thereby achieving engine balance.

These and further objects will become more readily apparent from a reading of the specification when examined in connection with the accompanying sheets of drawings.

In the drawings:

Figure 2 is an elevational view, partially in section, of a crankshaft constructed for use in the engine shown in Figure 1, the said view also showing a fan belt pulley hub and a flywheel connected to opposite ends of the crankshaft;

Figure 3 is a cross-sectional view on the line 3—3 of Figure 2;

Figure 7 is a fragmentary elevational view, partially in section, of another type crankshaft adapted to be utilized in connection with the engine shown in Figure 6.

Figure 1:
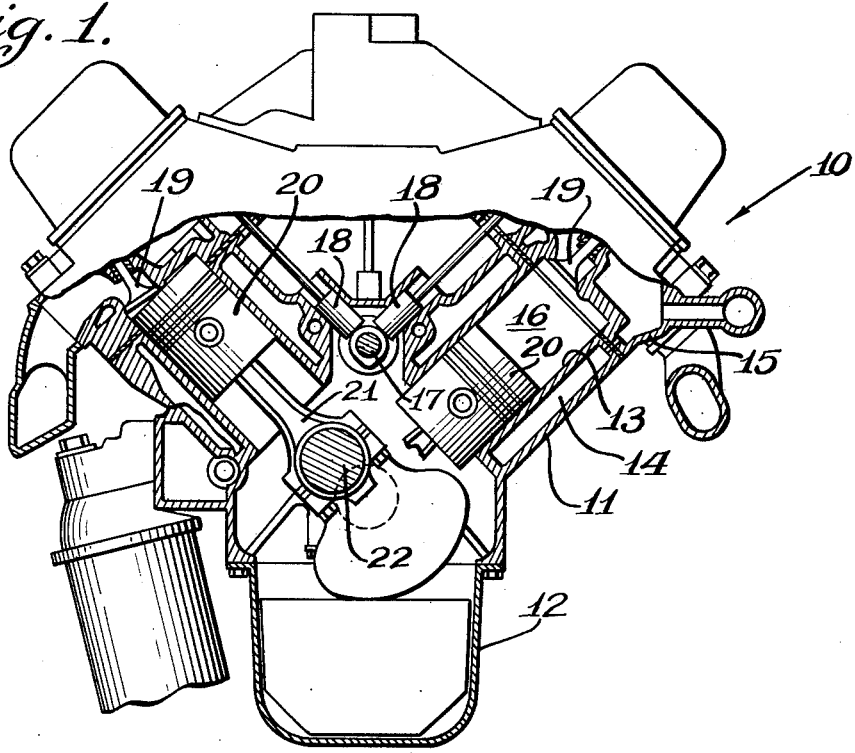
Figure 1 is a cross-sectional view through a V-8 type of internal combustion engine, the said view showing cylinders and pistons of a certain displacement.

Referring now particularly to Figures 1 through 5, an internal combustion engine of the V type is designated by the reference character 10. The engine 10 comprises essentially an engine block 11 having a crank case 12. The block 11 is provided with cylinders 13 which are suitably surrounded by water jackets 14 provided in the block 11. Each engine block 11 also is provided at its upper end with a cylinder head 15 and each cylinder 13 is provided with a combustion chamber 15.

The engine block 11 also comprises a cam shaft 17 having, suitably in engagement therewith, a plurality of valve lifters 18. The valve lifters 18 are adapted to suitably actuate valves designated at 19.

Each cylinder 13 also is provided with pistons 20 of a certain displacement, the said pistons 20 having connected thereto connecting or piston rods 21.

The engine 10 is provided with a crankshaft 22, the said crankshaft being particularly in enlarged form in Figure 2. The crankshaft 22 is constructed with a plurality of aligned journal portions 23 which suitably serve to journal the same on the engine block 11. Each crankshaft 22 also includes a plurality of piston or connecting rod journals 24 and the piston and the crankshaft 22 is also provided with a plurality of counterweights or cheeks 25. In the construction of the crankshaft 22 the same is provided with a plurality of lightening holes 26 or what may be commonly referred to as balance holes. These generally are formed by drilling or boring operations and the location is accurately determined so that proper unbalance is achieved. The front end of the crankshaft 22 is provided with a connecting portion 27 and the rear is provided with a connecting portion 28. A fan belt pulley hub 29 is connected to the connecting portion 27, the said hub 29 being suitably connected to a fan belt pulley 30. A lock plate 31 and a nut 32 suitably connect the pulley hub to the connecting portion 27. As shown particularly in Figure 4, the pulley hub 29 is provided with balance or lightening holes 34.

Figure 5:
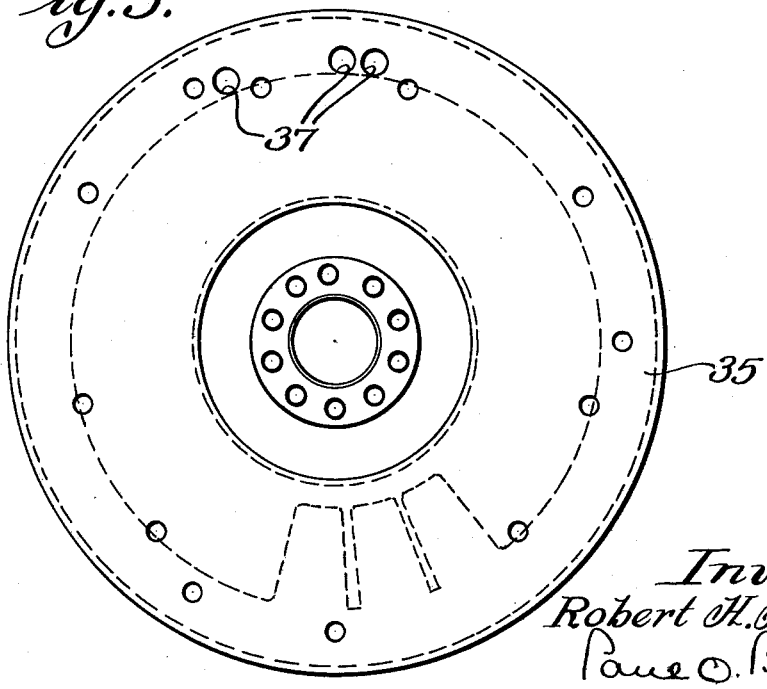
Figure 5 is an elevational view of the rear face of a flywheel.

A flywheel, as best shown in Figures 2 and 5 is designated at 35, the said flywheel 35 being connected by means of nuts 36 to the connecting portion 28 of the crankshaft 22. The flywheel 35 also includes a plurality of lightening or balance holes 37.

Figure 6:
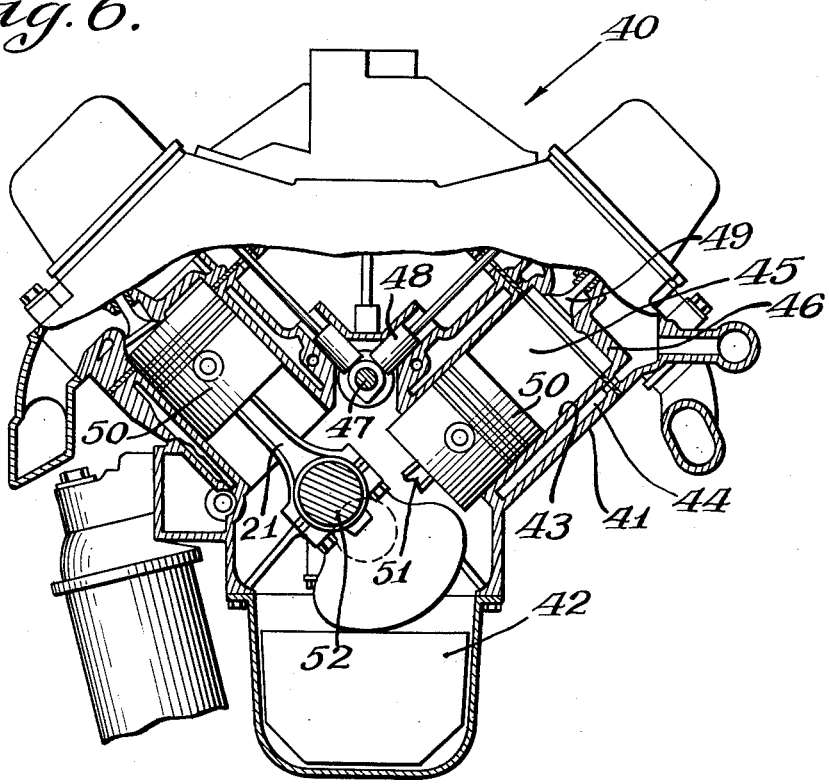
Figure 6 is a cross-sectional view through a V-8 type of engine, the said engine including cylinders and pistons of greater displacement and size than the engine shown in Figure 1.
Figure 4:
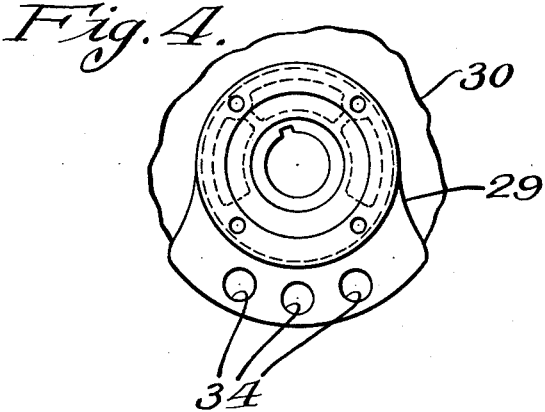
Figure 4 is a fragmentary view, in elevation, viewing the rear face of a fan pulley hub.

Referring now to Figure 6 an internal combustion engine of the V-8 type as designed is designated at 40. The engine 40 is of larger piston displacement and greater horse power than the engine shown in Figure 1. Certain parts of the engine 40 and engine 10 are identical and the engine block is designated at 41. The engine 40 also includes the crank case 42, and the block 41 is provided with enlarged cylinders 43 which are surrounded by water jackets 44. The cylinders 43 include combustion chambers 45 and a cylinder head 46 is connected to the top of the block 41. The engine 40 also includes a cam shaft 47 adapted to engage a plurality of valve lifters 48 for controlling valves 49. Cylinders 43 are provided with pistons 50 having connecting or piston rods 51 connected thereto.

A crankshaft 52 is provided in the engine 40. The crankshaft 52 is substantially identical to the crankshaft shown in Figure 1, having journal portions 53 and connector rod journals 54. Like the crankshaft 22, the crankshaft 52 is provided with counterweights or cheeks 55. The crankshaft 52 is substantially identical, as stated above, to the crankshaft 22 with the exception that, as indicated in Figure 7, the balance holes or lightening holes 56 are of considerable less depth that those in Figure 2 wherein the holes 26 extend completely through the cheek, the said difference or less depth of the holes in the crankshaft 52 being necessary to compensate the increased weight of the larger size pistons shown in the engine of Figure 6. Thus while all of the parts of the crankshafts 22 and 52 are identical before the lightening holes are machined into the crankshafts, they are different when assembled with the respective engines.

In the process of constructing the engines of Figures 1 and 6, substantially identical parts are utilized, with the exception that the cylinders are of different displacement or size as indicated.

Also the pistons, as indicated, are of different size in each of the engines. Thus the engine of Figure 1 has a certain piston displacement and the engine of Figure 6 has a larger piston displacement. In the employment of the crankshafts it is of course necessary to properly balance each engine so that proper performance is effected. In order to achieve such balance it is desirable to produce or construct each crankshaft in a certain manner so that with the employment of identical fan pulley hubs and fly wheels, proper balance is achieved in each engine though the crankshaft design is altered. It is generally known that larger engines require a more difficult balancing job and therefore the size factor of the counterweights is first determined for the larger engine crankshaft. Thus the crankshaft is designed and constructed for the larger engine. After the crankshaft has been cast and machined it is then placed in a balance machine and balanced at a certain unbalance. These special machines simulate the conditions within the engine and as a result of the operation of the machine the lightening or balance holes are drilled to the depths in the cheeks 55 as indicated in Figure 7. The fan pulley hubs and the fly wheels are also then placed in similar machines and they are also balanced at a certain unbalance by means of lightening or balance holes 34 and 26. The larger engine is then assembled and by virtue of the balance holes, both in the fan pulley hub and in the fly wheel, and couterweights, the engine is then assembled and balance of the same is achieved.

As indicated in the objects of the invention, it is desirable to provide lesser operations in the construction of engines and therefore it is desired to use as many identical parts as is possible. This is achieved in applicant's process and the crankshaft 52 which is identical before balancing to the crankshaft 22, is then placed into the machine for balancing. For the smaller engine, then the crankshaft 22 results. In this crankshaft 22 the balance holes 26 are completely drilled through the cheeks or may be partially drilled depending upon the particular unbalance or balance which is necessary to effectuate the end result of proper balance of the engine. Conceivably the holes 56 need not be required at all if the balance of the crankshaft 22 is at its proper unbalance. However of course, the balance holes 56 would be required and then might be drilled through completely. Since the crank shaft 52 has now been properly constructed it is now assembled with the fan belt pulley hub 29 and the fly wheel 35. The fan belt pulley hub 29 and the fly wheel 35 is thus the same for both engines and the assembly is assembled into the engine and proper balance is achieved.

It is contemplated that more than two engines can thus be constructed wherein different types or designed crankshafts are utilized and yet the same fly wheels and fan belt pulley hubs are employed. Thus it is obvious that proper balance of each engine is achieved with the utilization of the maximum number of identical parts. The only changes that are necessary are in the design of the crankshaft. Thus considerable time and effort is achieved in the construction and assembly of the engines.

Thus the objects of the invention have been fully achieved and it must be understood that various changes may be made in the process without departing from the spirit of the invention as disclosed or the scope thereof as defined in the appended claim.

What is claimed is:

A process for constructing engines, a first engine having pistons of certain displacement, and a second engine having pistons of greater displacement, the pistons including connecting rod assemblies, and the pistons and connecting rod assemblies of the first engine having a mass less than the second engine, comprising constructing a first crankshaft for the first engine, the said first crankshaft being statically and dynamically unbalanced, constructing a second crankshaft for the second engine, said first and second crankshafts including cheeks and journals and being initially identical and dynamically unbalanced to such a degree that when assembled with substantially identical pulley hubs and flywheels, and said connecting rod assemblies and pistons of greater mass within the engine block of the engine of greater piston displacement that the whole assembly will be in dynamic balance, removing portions of said first crankshaft by drilling holes in said cheeks to lighten the same whereby said first crankshaft is of lighter weight than said second crankshaft, said second crankshaft thereby being of different construction than said first crankshaft and statically and dynamically unbalanced, to such a degree that when assembled with the substantial identical pulley hubs and flywheels and said connecting rod assemblies and pistons of less mass within the engine block of the engine of less piston displacement, that the whole assembly will be in dynamic balance.

References Cited in the file of this patent

UNITED STATES PATENTS

| | | |
|---|---|---|
| Re. 24,262 | Turlay | Dec. 25, 1956 |
| 1,512,479 | Oldson | Oct. 21, 1924 |
| 2,020,406 | Ford | Nov. 12, 1935 |
| 2,450,701 | Wahlberg et al. | Oct. 5, 1948 |
| 2,779,217 | Stovall | Jan. 29, 1957 |
| 2,783,649 | Hope | Mar. 5, 1957 |
| 2,787,907 | King | Apr. 9, 1957 |

OTHER REFERENCES

Automobile Engineer's Reference Book (Molloy, Lanchester), published by George Newnes Ltd. (London), Sec. 3, pp. 161–165, 168 relied on.

Dynamics in Machines (Crossley), published by Ronald Press Co. (New York), pp. 334–337, 359–362 relied upon.

Design News, June 1, 1956, pp. 26–27.